US008176220B2

(12) United States Patent
Koka et al.

(10) Patent No.: US 8,176,220 B2
(45) Date of Patent: May 8, 2012

(54) PROCESSOR-BUS-CONNECTED FLASH STORAGE NODES WITH CACHING TO SUPPORT CONCURRENT DMA ACCESSES FROM MULTIPLE PROCESSORS

(75) Inventors: Pranay Koka, Austin, TX (US); Michael Oliver McCracken, Austin, TX (US); Herbert Dewitt Schwetman, Jr., Austin, TX (US); Jan Lodewijk Bonebakker, Amersfoort (NL)

(73) Assignee: Oracle America, Inc., Redwood City, CA (US)

( * ) Notice: Subject to any disclaimer, the term of this patent is extended or adjusted under 35 U.S.C. 154(b) by 249 days.

(21) Appl. No.: 12/572,189

(22) Filed: Oct. 1, 2009

(65) Prior Publication Data

US 2011/0082965 A1 Apr. 7, 2011

(51) Int. Cl.
*G06F 13/00* (2006.01)
(52) U.S. Cl. .......... 710/22; 711/103; 711/118; 711/154; 711/203; 709/217
(58) Field of Classification Search .................. 709/217; 710/22; 711/103, 118, 154, 203
See application file for complete search history.

(56) References Cited

U.S. PATENT DOCUMENTS

2009/0240869 A1* 9/2009 O'Krafka et al. ............. 711/103
2010/0293420 A1* 11/2010 Kapil et al. ................... 714/710

OTHER PUBLICATIONS

Caulfield, A. M., Grupp, L. M., and Swanson, S., Gordon: Using Flash Memory to Build Fast, Power-efficient Clusters for Data-intensive Applications, ASPLOS'09, Mar. 7-11, 2009, pp. 1-12.

* cited by examiner

*Primary Examiner* — Hong Kim
(74) *Attorney, Agent, or Firm* — Osha • Liang LLP

(57) ABSTRACT

A system includes multiple nodes coupled using a network of processor buses. The multiple nodes include a first processor node, including one or more processing cores and main memory, and a flash memory node coupled to the first processor node via a first processor bus of the network of processor buses. The flash memory node includes a flash memory including flash pages, a first memory including a cache partition for storing cached flash pages for the flash pages in the flash memory and a control partition for storing cache control data and contexts of requests to access the flash pages, and a logic module including a direct memory access (DMA) register and configured to receive a first request from the first processor node via the first processor bus to access the flash pages.

5 Claims, 8 Drawing Sheets

PROCESSOR-BUS-CONNECTED FLASH STORAGE NODES WITH CACHING TO SUPPORT CONCURRENT DMA ACCESSES FROM MULTIPLE PROCESSORS

BACKGROUND

Over the years improvements in input/output (I/O) performance have not kept pace with those of processor or memory performance. As a result, computing systems are becoming largely I/O limited. Typical storage devices attached to computing nodes are hard disk drives (HDD) with spinning disk media and are attached to the computing nodes through I/O channels (e.g., PCI-express, etc.) as a local disk storage or through a storage area network (SAN) as a shared disk storage. The HDD based storage systems have the following disadvantages:

(a) Long disk access latencies (e.g., on the order of milliseconds).

(b) Long I/O bus and interface latencies.

(c) Inefficient latency overhead for small size data access causing HDD storage to be unsuitable for random access of small data elements.

(d) Limited capacity of HDD-integrated DRAM/SRAM caches due to space and power constraints.

Paging is a method in a computer operating system to store and retrieve data from secondary storage for use in main memory. In particular, the operating system retrieves data from the secondary storage in same size blocks called pages. Paging is an important part of virtual memory implementation in most contemporary general-purpose operating systems, allowing them to use disk storage for data that does not fit into physical main memory. High performance computing (HPC) applications exhibit a wide range of memory access patterns from sequential to completely random accesses. As a result, the memory working sets also vary widely with different applications. From a virtual memory paging perspective, the memory access patterns can be classified as:

(i) Sequential/random access patterns over a memory working set that does not exceed the capacity of the main memory (DRAM).

(ii) Random access pattern over a large working set (i.e., a large number of memory pages) that exceed the capacity of the main memory (DRAM).

Application workloads of category (i) benefit from high speed access to memory (e.g., to avoid long stalls) but do not require high speed paging devices. Application workloads of category (ii) benefit from high speed paging devices more than from fast memory. Generally speaking, application workloads of category (ii) are usually executed using a truncated datasets to avoid random access pattern exceeding the capacity of the main memory (DRAM) and the undesirable result of paging to long latency storage device.

Flash memory is a non-volatile computer memory that can be electrically erased and rewritten in large blocks. HyperTransport is a processor interconnection technology with bidirectional serial/parallel high-bandwidth, low-latency point-to-point links and is promoted and developed by the HyperTransport Consortium. The technology is used by various vendors, for example in the form of !HyperTransport® (!HyperTransport® is a registered trademark of Advanced Micro Devices, Sunnyvale, Calif.). The Intel® QuickPath Interconnect (QPI) (Intel® is a registered trademark of Intel Corporation, Santa Clara, Calif.) is a point-to-point processor interconnect developed by Intel to compete with HyperTransport. Prior to the announcement of the name, Intel referred to it as Common System Interface (CSI). Earlier incarnations were known as YAP (Yet Another Protocol) and YAP+.

SUMMARY

In general, in one aspect, the invention relates to a system includes multiple nodes coupled using a network of processor buses. The multiple nodes include a first processor node, including one or more processing cores and main memory, and a flash memory node coupled to the first processor node via a first processor bus of the network of processor buses. The flash memory node includes a flash memory including flash pages, a first memory including a cache partition for storing cached flash pages for the flash pages in the flash memory and a control partition for storing cache control data and contexts of requests to access the flash pages, and a logic module including a direct memory access (DMA) register and configured to receive a first request from the first processor node via the first processor bus to access the flash pages, wherein the first request is received using the DMA register that is mapped into an address space of the first processor node, store one or more parameters of the first request as a first context of the contexts stored in the control partition of the first memory, schedule a DMA operation responsive to the first request, and perform the DMA operation based on the first context, wherein the DMA operation transfers data between the flash memory and the first processor node and includes accessing the cache partition in the first memory when a portion of the flash pages is cached in the cache partition according to the cache control data.

In general, in one aspect, the invention relates to a method for accessing a processor-bus-connected flash storage module (PFSM) operatively coupled to a processor via a processor bus. The PFSM includes a flash memory, a buffer memory, and a processor accessible command register mapped into an address space of the processor. The method includes receiving a page access request from the processor via the processor bus using the processor accessible command register, storing one or more parameters of the page access request in the buffer memory as a context of the page access request, scheduling a flash memory access responsive to receiving a trigger parameter of the one or more parameters, performing the scheduled flash memory access based on the context, and issuing a command of the processor bus in conjunction with performing the scheduled flash memory access to transfer data between the PFSM and the processor.

In general, in one aspect, the invention relates to a method for accessing a virtual memory of a processor using a processor-bus-connected flash storage module (PFSM) as a first paging device and a hard disk drive (HDD) as a second paging device. The PFSM is operatively coupled to the processor via a processor bus. The PFSM includes a flash memory and a virtual address mapping table. The method includes allocating a first address partition and a second address partition of the virtual memory for a software application of the processor to the first paging device and the second paging device, respectively, identifying a virtual memory page in the first paging device responsive to a page fault of the virtual memory triggered by the software application, sending a page access request to the PFSM for accessing the virtual memory page responsive to the page fault, wherein the page access request is sent via the processor bus and comprises a virtual address of the virtual memory page, and receiving the virtual memory page from the PFSM based on a command of the processor bus issued by the PFSM in conjunction with performing a flash memory access in the flash memory using a flash page address, wherein the virtual address mapping table translates the virtual address of the virtual memory page to the flash page address in the flash memory.

Other aspects of the invention will be apparent from the following description and the appended claims.

DETAILED DESCRIPTION

Figure 1:
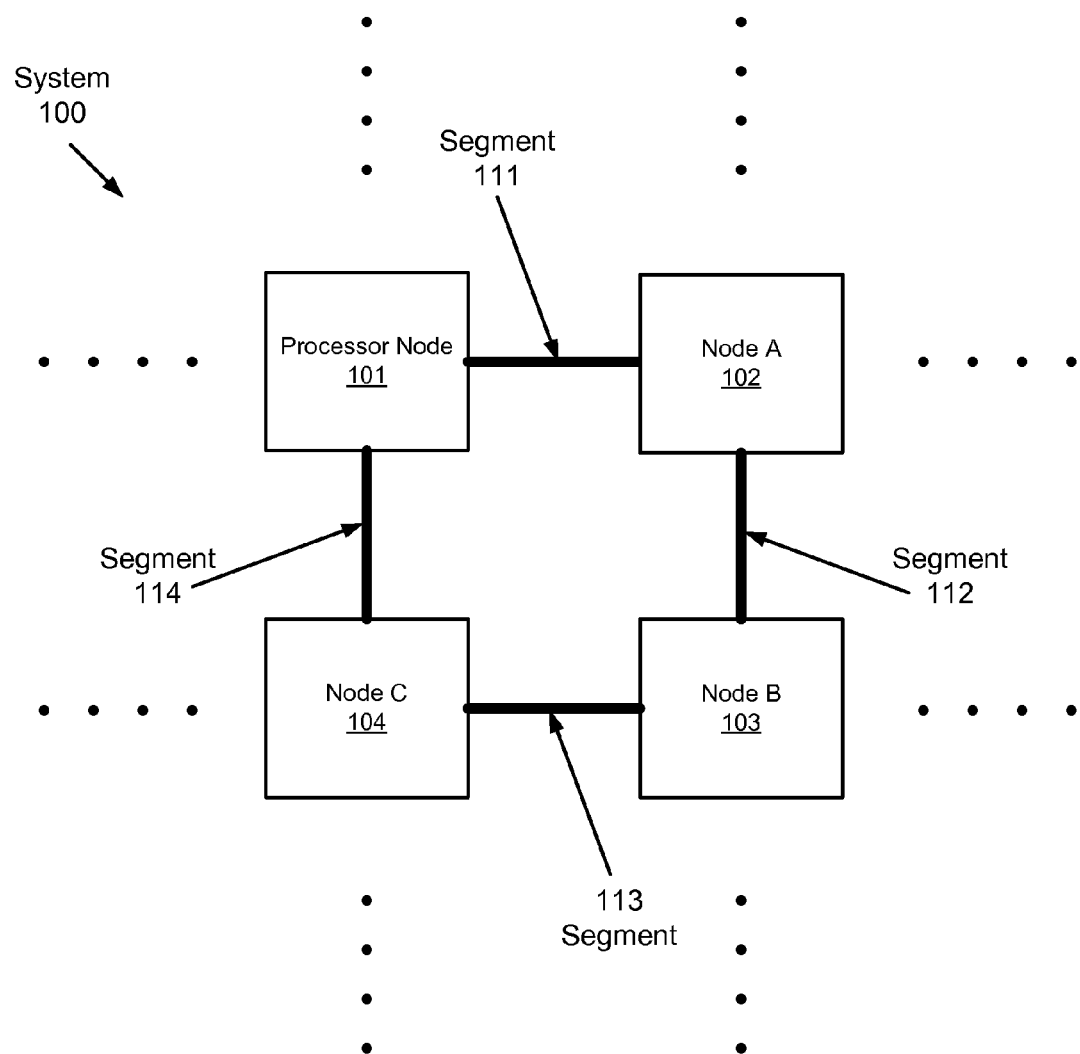
FIGS. 1-3 depict a block diagram of a system in accordance with one or more embodiments of the invention.

Specific embodiments of the invention will now be described in detail with reference to the accompanying Figures. Like elements in the various Figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a system and method for a flash memory (e.g., NOR (i.e., negation of OR operation) flash memory, NAND (i.e., negation of AND operation) flash memory, etc.) storage module that is attached directly to the host processor bus. Examples of such processor bus include HyperTransport, QPI, etc. The low latency access characteristics of the flash memory compared to HDD along with the high bandwidth, low-overhead characteristics of the processor bus result in a high performance storage system.

Further, embodiments of the invention provide a system and method for optimizing performance on software workloads with various paging requirements based on a combination of a fast (flash memory based) virtual memory paging device and a slow (HDD based) paging device without affecting the performance of regular memory operations.

Figure 2:
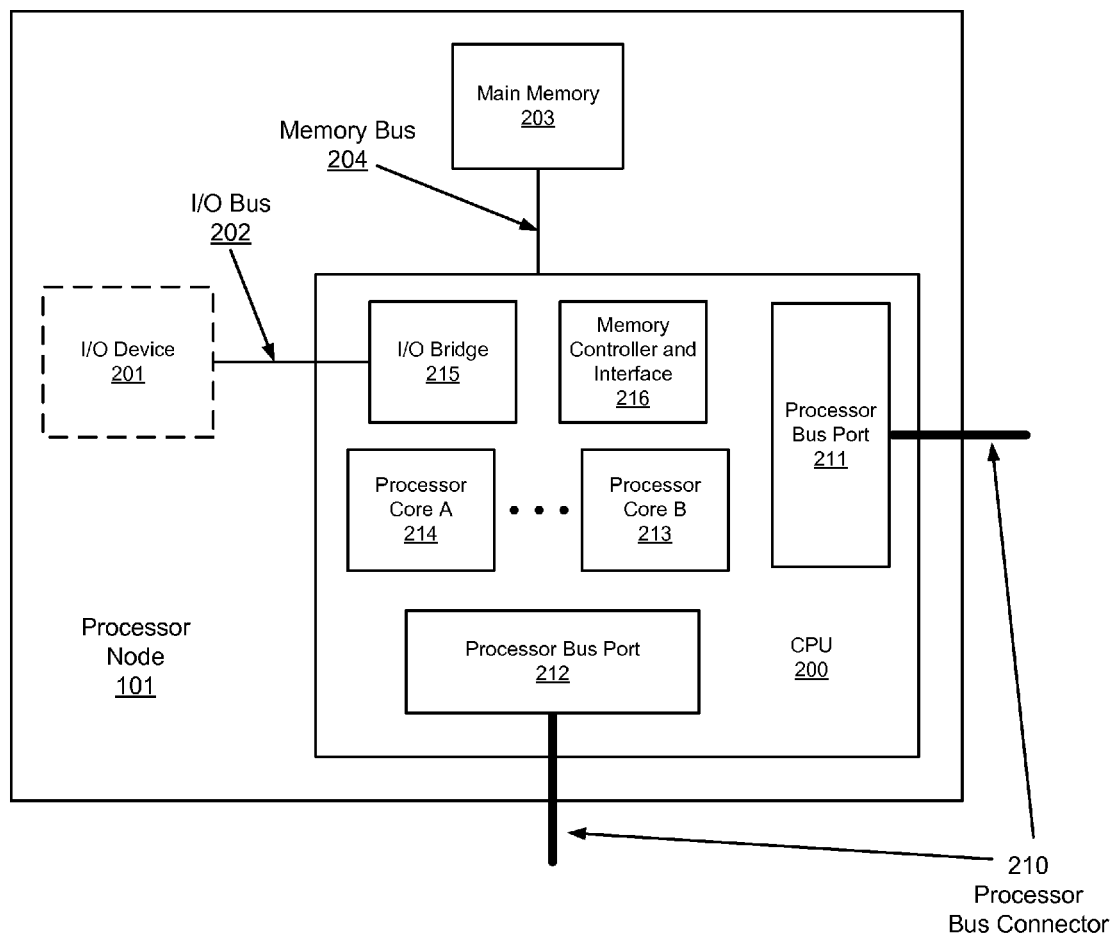
Figure 3:
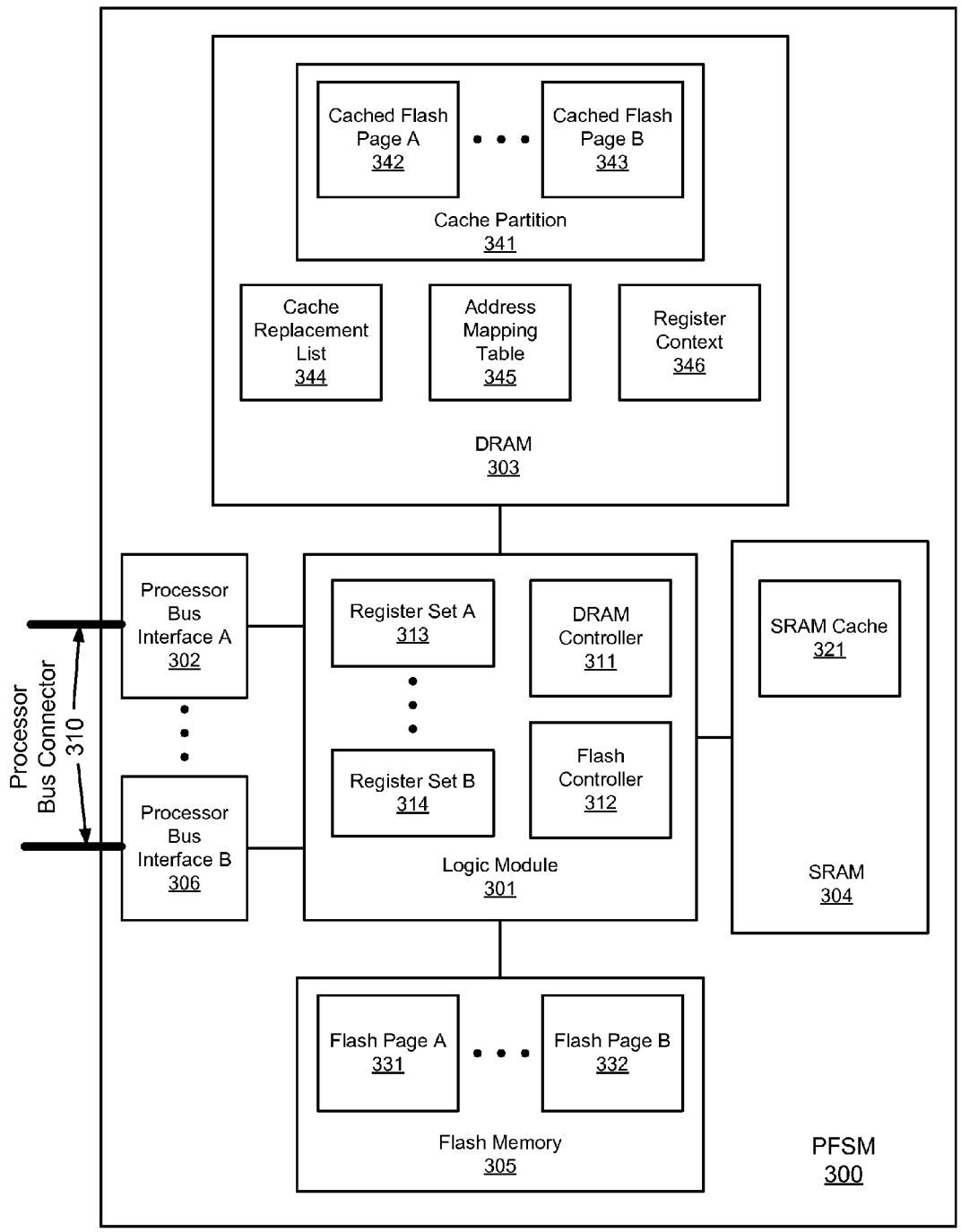

FIGS. 1-3 depict a block diagram of a system (100) in accordance with one or more embodiments of the invention. Those skilled in the art, having the benefit of this detailed description, will appreciate the components shown in FIG. 1 may differ among embodiments of the invention, and that one or more of the components may be optional. In one or more embodiments of the invention, one or more of the components shown in FIG. 1 may be omitted, repeated, supplemented, and/or otherwise modified from that shown in FIG. 1. Accordingly, the specific arrangement of components shown in FIG. 1 should not be construed as limiting the scope of the invention.

As shown in FIG. 1, the system (100) includes a number of nodes, namely processor node (101), node A (101), node B (102), node C (103), node D (104), etc. coupled using an interconnection network (e.g., including segments 111, 112, 113, 114, etc.). The dotted lines represent additional nodes and interconnections not specifically shown in FIG. 1. At least one of the nodes is a processor node (101) of which more details are shown in FIG. 2. In one or more embodiments of the invention, other nodes (102, 103, 104, etc.) include other processor nodes and one or more processor-bus-connected flash storage module (PFSM) node of which more details are shown as the PFSM (300) in FIG. 3. In such embodiments, the PFSM (300) is connected to one or more such interconnection network segments and is accessible by processor nodes in the system (100) either via direct point-to-point connectivity or via forwarding. Further, interconnection network segment may be omitted among any adjacent PFSMs in the system (100).

In one or more embodiments, segments (e.g., 111, 112, 113, 114, etc.) of the interconnection network may be configured in various configurations such as a nearest-neighbor configuration, a bus configuration, a star configuration, a switch configuration, or other suitable configurations. In one or more embodiments, the nodes (e.g., 101, 102, 103, 104, etc.) of the system (100) communicate with each other using segments (e.g., 111, 112, 113, 114, etc.) of the interconnection network according to a communication protocol, which is a convention or standard that controls and enables the connection, communication, and data transfer between any two nodes in communication. Generally speaking, communication protocols may be implemented by hardware, software, or combinations thereof.

In one or more embodiments, each segment (e.g., 111, 112, 113, 114, etc.) of the interconnection network includes processor bus (e.g., HyperTransport, QPI, etc.) and the communication protocol is a processor bus protocol specific to the processor bus.

FIG. 2 depict a block diagram of the processor node (101) in accordance with one or more embodiments of the invention. Those skilled in the art, having the benefit of this detailed description, will appreciate the components shown in FIG. 2 may differ among embodiments of the invention, and that one or more of the components may be optional. In one or more embodiments of the invention, one or more of the components shown in FIG. 2 may be omitted, repeated, supplemented, and/or otherwise modified from that shown in FIG. 2. Accordingly, the specific arrangement of components shown in FIG. 2 should not be construed as limiting the scope of the invention.

As shown in FIG. 2, the processor node (101), which can also be used as any of the nodes (102, 103, 104, etc.) of FIG. 1, includes a CPU (central processing unit) (200), an I/O bus (202) for interfacing to an attached I/O device (201), and main memory (203) coupled to the CPU (200) via a memory bus (204). The CPU (202) further includes one or more processor cores, namely processor core A (214), processor core B (213), etc., an I/O bridge (215) for communicating with the I/O device (210), a memory controller and interface (216) for communicating with the main memory (203), and one or more processor bus ports (211, 212, etc.) for communicating with other nodes (102, 103, 104, etc.) in the system (100) via segments (111, 112, 113, 114, etc.) of the interconnection network described in reference to FIG. 1 above. For example, the processor ports (211, 212, etc.) may be attached to the processor bus connectors (210) for connecting to the segments (111, 112, 113, 114, etc.). In one or more embodiments of the invention, the CPU (202) further includes a cache hierarchy (not shown), which together with the main memory (203) forms a CPU memory hierarchy.

In one or more embodiments, the I/O bridge (201) is an I/O controller hub. Examples of the I/O device (201) includes data storage (e.g., HDD, solid state disk drive, etc.), communication (e.g., networking), and other peripheral devices. Generally speaking, the I/O device (201) may be external to the processor node (101) depending on the physical size. In particular, the processor bus and the processor bus protocol are optimized for communication among processor nodes (e.g., 101) and are distinct from the I/O bus (202), the memory bus (204), and the respective associated communication protocols, which are optimized for I/O and memory accesses. Accordingly, bus interface functionalities of the processor bus port (211, 212, etc.) are distinct from those of the I/O bridge (215) and the memory controller and interface (216).

In one or more embodiments, the main memory stores instructions for execution by the processor cores (213, 214, etc.) including functionalities such as accessing the PFSM as a flash disk, a heterogeneous paging device, etc. More details of such functionalities are described in reference to FIGS. 4-7 below. In one or more embodiments, each of the processor cores (213, 214, etc.) may execute one or more application threads of the aforementioned instructions.

FIG. 3 depict a block diagram of a PSFM (300) in accordance with one or more embodiments of the invention. Those skilled in the art, having the benefit of this detailed description, will appreciate the components shown in FIG. 3 may differ among embodiments of the invention, and that one or more of the components may be optional. In one or more embodiments of the invention, one or more of the components shown in FIG. 3 may be omitted, repeated, supplemented, and/or otherwise modified from that shown in FIG. 3. Accordingly, the specific arrangement of components shown in FIG. 3 should not be construed as limiting the scope of the invention.

As shown in FIG. 3, the PSFM (300), which can be used as any of the nodes (102, 103, 104, etc.) of FIG. 1, includes a logic module (301), one or more processor bus interfaces, namely processor bus interface A (302), processor bus interface B (306), etc., DRAM (dynamic random access memory) (303), SRAM (static random access memory) (304), and flash memory (305). In one or more embodiments of the invention, the logic module (301) is implemented as an ASIC (application specific integrated circuit) while the DRAM (303), the SRAM (304), and the flash memory (305) are memory arrays implemented using commercially available memories devices.

As shown in FIG. 3, the logic module (301) further includes one or more register sets, namely register set A (313), register set B (314), etc., a DRAM controller for controlling the DRAM (303), and a flash controller (312) for controlling the flash memory (305). In one or more embodiments, the flash controller (312) is configured to optimize wear characteristics of flash memory cells in the flash memory (305).

As shown in FIG. 3, the flash memory (305) further includes flash pages, namely flash page A (331), flash page B (332), etc., which are smallest size blocks of flash memory cells individually accessible (e.g., for read access, write access, etc.). For example, each of the flash pages (331, 332, etc.) may consist of 2K-bit blocks, 4K-bit blocks, 8K-bit blocks, or other size blocks depending on the underlying design and technology of the flash memory (305).

As shown in FIG. 3, the DRAM (305) further includes a cache partition (341) consisting of cached flash pages, namely cached flash page (342), cached flash page (343), etc. storing images of recently accessed flash pages (e.g., 331, 332, etc.) in the flash memory (305) according to a predetermined cache policy, a cache replacement list (344) for storing information pertaining to the aforementioned cache policy, an address mapping table (345) for mapping addresses to ultimately reference physical locations in the flash memory (305), and register context (346) for extending the register sets (313, 314, etc.). In one or more embodiments, the cache partition (341) is configured as a cache to the flash memory (305) with the cache replacement list (344) being a LRU (least recently used) list. In such embodiments, read accesses are first checked in the DRAM (303) before being read from the flash memory (305) while write accesses are first written to the DRAM (303) and subsequently transferred to the flash memory (305). In addition, cached flash pages may be evicted and replaced according to the aforementioned cache policy.

As shown in FIG. 3, the SRAM (304) further includes a SRAM cache (321) for caching control data in the DRAM (303) outside of the cache partition (341). In one or more embodiments, the register context (346) are allocated in the DRAM (303) with accesses (reads/writes) to the contexts being performed via the SRAM (304) for faster access.

In one or more embodiments, the processor bus interfaces (302, 306, etc.) are configured to perform signaling, error detection, flow control, etc. over the attached segment (e.g., 111, 112, 113, 114, etc.) of the interconnection network described in reference to FIG. 1. For example, the processor bus interfaces (302, 306, etc.) may be attached to the processor bus connectors (310) for connecting to the segments (111, 112, 113, 114, etc.). In one or more embodiments, the processor bus connectors (310) are substantially the same as the processor bus connectors (210) of FIG. 2. As discussed above, in one or more embodiments, each segment (e.g., 111, 112, 113, 114, etc.) of the interconnection network consists of a processor bus. In such embodiments, the processor bus interface (302) is configured to perform signaling, error detection, flow control, etc. according to the processor bus protocol specific to the processor bus.

In one or more embodiments, the logic module (301) is the processing engine of the PFSM (300). Specifically, the logic module (301) is configured to decode and/or issue commands using the processor bus protocol associated with the processor bus connecting the PFSM (300) and other processor node (e.g., 101) of FIG. 1. In particular, the logic module (301) is configured to transfer data between the memory hierarchy (i.e., the flash memory (305), the DRAM (303), and/or SRAM (304)) and the processor bus in response to processor requests (e.g., for read access, write access, etc.) of processor nodes in the system (100).

In one or more embodiments, the logic module (301) is further configured to perform data transfers between the flash memory (305) and the DRAM (303) according to the aforementioned cache policy. In particular, the logic module (301) is configured to perform replacement of cached flash pages (e.g., 342, 343, etc.) based on the cache replacement list (344) when cache miss occurs.

In one or more embodiments, the logic module (301) is further configured to perform an address mapping function for the aforementioned data transfers between the memory hierarchy (i.e., the flash memory (305), the DRAM (303), and/or SRAM (304)) and the processor bus as well as the aforementioned data transfers between the flash memory (305) and the DRAM (303). More details of the address mapping function are described in the examples depicted in FIGS. 6-7 below.

In one or more embodiments, each of the register sets (313, 314, etc.) includes four command registers, namely CMDREG_1, CMDREG_2, CMDREG_3, and CMDREG_4 (not shown). Specifically, these four command registers are mapped to the processor address space of the processor node requesting access to the PFSM (300).

In one or more embodiments, CMDREG_1 is configured to store a command type field and a size field. For example, the command type field distinguishes between read and write commands while the size field specifies the size (e.g., number of flash pages) of data requested.

In one or more embodiments, CMDREG_2 is configured to store the address of the first flash page to be read or written to in the flash memory (305).

In one or more embodiments, CMDREG_3 is configured to store an address of the first page in main memory of the processor node requesting access to the PFSM (300).

In one or more embodiments, CMDREG_4 is configured as a trigger register that is used to initiate an operation in the logic module (301). In one or more embodiments, CMDREG_4 is written to only after contents of CMDREG_1, CMDREG_2, and CMDREG_3 are properly updated for the operation. In one or more embodiments, the operation is a DMA (direct memory access) operation while CMDREG_1, CMDREG_2, CMDREG_3, and CMDREG_4 are DMA control registers.

In one or more embodiments, multiple processor nodes in the system (100) are allowed to access the PFSM (300) in a concurrent manner. In one or more embodiments, multiple register sets (313, 314, etc.) are multiplexed to support operations (e.g., DMA operations) for multiple threads/processor cores/processor nodes in the system (100). In one or more embodiments, the register sets (313, 314, etc.) are extended for supporting concurrent accesses to the PFSM (300) from additional thread executions by storing additional copies of the four register values as context information in the register context (346).

In such embodiments, the logic module (301) is further configured to allocate and maintain multiple contexts in the register context (346) for each of such additional thread executions to support multiple outstanding requests from requesting threads/processor cores/processor nodes in the system (100). In one or more embodiments, such multiple contexts in the register context (346) are cached in the SRAM (304) and allocated dynamically by indexing using a processor node ID, a processor core ID, a thread ID, and a request ID. In such embodiments, flow control between the processor cores and PFSM (300) is managed using the processor bus flow control mechanisms of the processor bus and the processor bus protocol.

Figure 4:
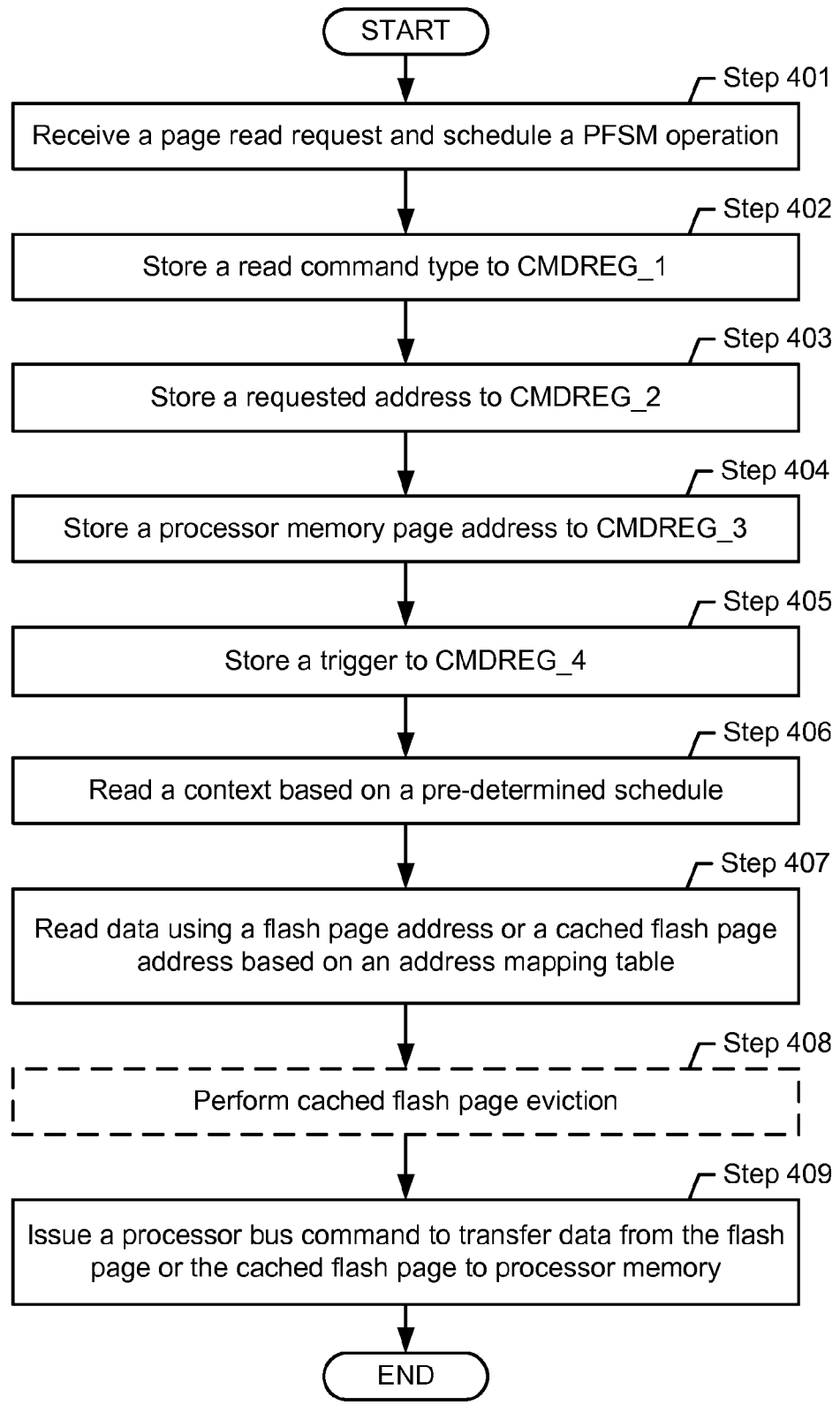
FIGS. 4 and 5 depict method flowcharts in accordance with one or more embodiments of the invention.

FIG. 4 depicts a flowchart of read access method in accordance with one or more embodiments of the invention. In one or more embodiments of the invention, one or more of the steps shown in FIG. 4 may be omitted, repeated, and/or performed in a different order. Accordingly, embodiments of the invention should not be considered limited to the specific arrangements of steps shown in FIG. 4.

In one or more embodiments of the invention, the method depicted in FIG. 4 may be practiced using the system (100), the processor node (101), and the PFSM (300) described above with respect to FIGS. 1, 2, and 3, respectively.

As shown in FIG. 4, initially in Step 401, a page read request is received, for example by an operating system from an application both of which may be executing on at least the processor node (101) in the system (100) of FIG. 1 above. Responsive to receiving such request, a PFSM operation (e.g., a DMA operation) may be scheduled, for example by a portion of the operating system (i.e., PFSM driver) that stores DMA control registers using parameters of the page read request. In one or more embodiments, the parameters of the page read request are stored in the DMA control registers using a CPU instruction (e.g., "store" instruction executed by the processor node (101)). In one or more embodiments, the DMA control registers includes the fours CMDREG registers as well as the register contexts described in reference to FIG. 3 above.

In Step 402, a read command type, the size of requested data in number of flash pages, and the request ID are stored to a CMDREG_1 register. In one or more embodiments, such stored information is obtained by parsing the page read request.

In Step 403, a requested address is stored to the CMDREG_2 register. In one or more embodiments, the requested address is the address of the first flash page to be read. In one or more embodiments, such stored information is obtained by parsing the page read request.

In Step 404, a memory address of the requesting processor node is stored to the CMDREG_2 register. In one or more embodiments, the memory address is the address of the first page in the main memory (of the processor sending the page read request) to receive the read data. In one or more embodiments, such stored information is obtained by parsing the page read request.

In Step 405, a trigger is stored to the CMDREG_4, for example as a signal to initiate the PFSM DMA operation.

In one or more embodiments, at least a portion of the four DMA control register contents stored in Steps 402-405 are further stored in a DRAM buffer (e.g., the cache partition of FIG. 3) as a context for a requesting thread of the requesting processor node. In one or more embodiments, the context area in the DRAM buffer is allocated during Step 402. In one or more embodiments, the contexts stored in the DRAM buffer is cached in a SRAM (e.g., 304 of FIG. 3).

In Step 406, a context is read based on a pre-determined schedule to initiate a corresponding PFSM operation. For example, the pre-determined schedule may be a polling schedule, an event driven schedule, etc. In one or more embodiments, upon receiving the store to CMDREG_4, the context is read to determine a read command for further processing.

In Step 407, data is read using a flash page address or a cached flash page address based on an address mapping table. For example, the address mapping table of FIG. 3 may be checked to determine if the requested data is cached in the cache partition of the DRAM buffer of FIG. 3.

In Step 408, a cached flash page may be optionally evicted for replacement. For example, the page eviction may be performed when data is read from the flash memory that is not cached in the DRAM as described in reference to FIG. 3 above. In such example, the flash page containing the read data may be cached where the evicted page resided while a cache replacement list and the address mapping table may be updated.

In Step 409, a processor-bus command is issued to transfer the data to processor memory when the data read operation is completed. In addition, a signal may be generated to notify the requesting processor node (specifically the requesting thread executing on a processor core of the requesting processor node) of the completion. For example, the processor-bus command and the signal may be based on the processor bus protocol described in reference to FIGS. 1-3 above. In one or more embodiments, the signal is an interrupt signal.

Figure 5:
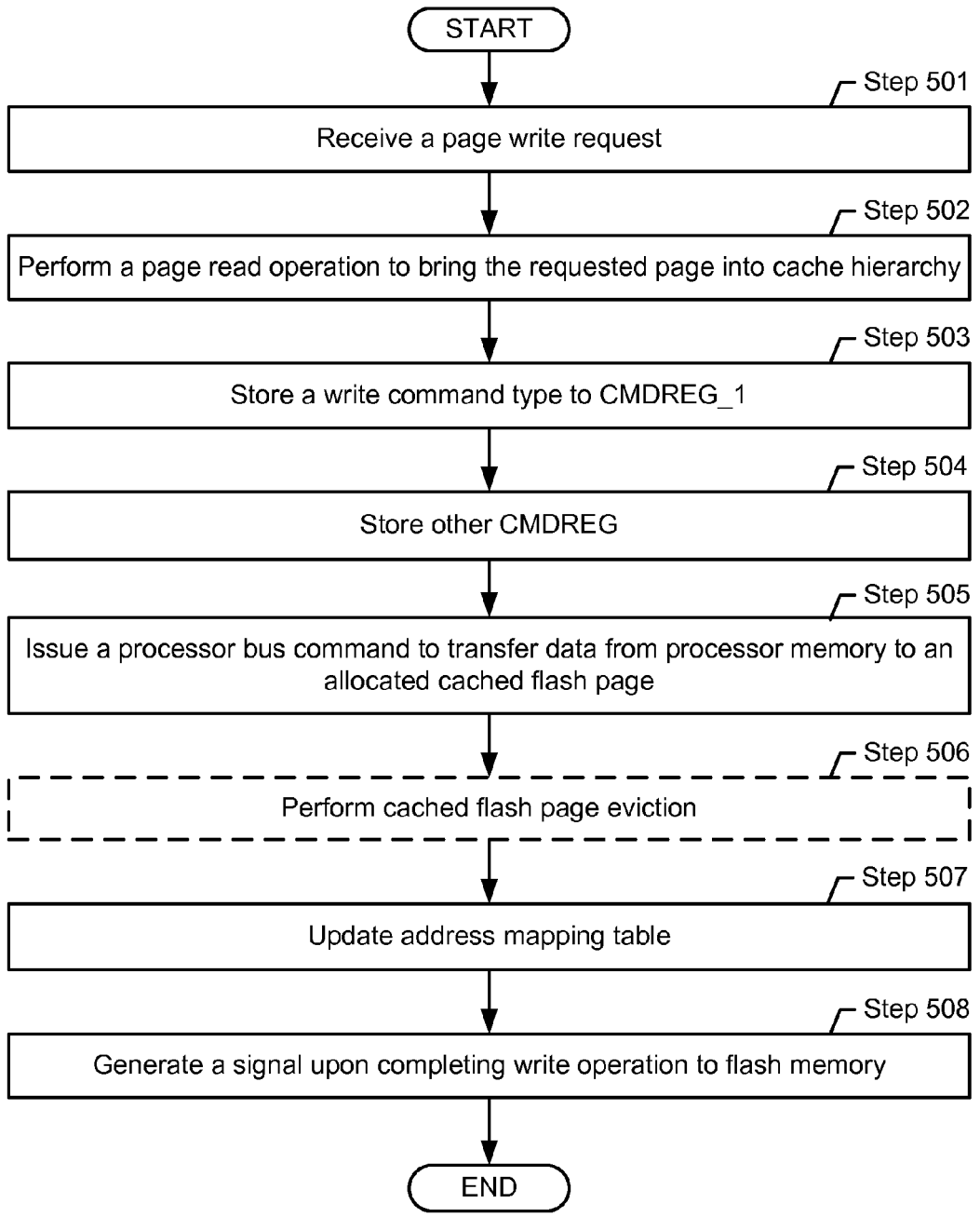

FIG. 5 depicts a flowchart of write access method in accordance with one or more embodiments of the invention. In one or more embodiments of the invention, one or more of the steps shown in FIG. 5 may be omitted, repeated, and/or performed in a different order. Accordingly, embodiments of the invention should not be considered limited to the specific arrangements of steps shown in FIG. 5.

In one or more embodiments of the invention, the method depicted in FIG. 5 may be practiced using the system (100), the processor node (101), and the PFSM (300) described above with respect to FIGS. 1, 2, and 3, respectively.

As shown in FIG. 5, initially in Step 501, a page write request is received, for example by an operating system from an application both of which may be executing on at least the processor node (101) in the system (100) of FIG. 1 above. Responsive to receiving such request, in Step 502, a PFSM read operation (e.g., as described in reference to FIG. 4 above) may be scheduled, for example by a portion of the operating system (i.e., PFSM driver) that brings the flash page requested by the write request into the cache hierarchy as a cached page. For example, the cache hierarchy may include the cache hierarchy in the processor node of FIG. 2 and the cached flash page in the cache partition of FIG. 3. Once the cached page corresponding to the requested flash page is in the cache hierarchy, in one or more embodiments, the page write request is performed to the cached page where the written page is marked dirty. In one or more embodiments, the dirty page is written back to the flash memory upon being evicted according to the cache policy governing the processor cache hierarchy.

Steps 503-508 describe the ensuing write back operation. In Step 503, a write command type, the size of requested data in number of flash pages, and the request ID are stored to a CMDREG_1 register. In one or more embodiments, such stored information is obtained by parsing the page write request.

In Step 504, other CMDREG are stored in a similar manner as Steps 403-405 described in reference to FIG. 4 above with the parameters consistent with the direction of DMA data transfer for the write operation, i.e., data is read from processor memory and written into the flash memory. In one or more embodiments, the parameters of the page write request are stored in the DMA control registers using a CPU instruction (e.g., "store" instruction executed by the processor node (101)).

In one or more embodiments, at least a portion of the four DMA control register contents stored in Steps 503 and 504 are further stored in a DRAM buffer (e.g., the cache partition of FIG. 3) as a context for the aforementioned write back operation following the page eviction. In one or more embodiments, the context area in the DRAM buffer is allocated during Step 503. In one or more embodiments, the contexts stored in the DRAM buffer is cached in a SRAM (e.g., 304 of FIG. 3).

In Step 505, a processor-bus command is issued to transfer data from the dirty page to be evicted from the cache hierarchy of the processor node (i.e., in the processor memory hierarchy) to a location in a PFSM DRAM buffer. In one or more embodiments, in Step 506, cached flash page eviction is optionally performed if such location already stores a cached flash page described in reference to FIG. 3 above. In such scenario, data write back to the flash memory is performed if the evicted cached flash page is marked dirty. At the same time, a cache replacement list and the address mapping table may be updated accordingly in Step 507.

In Step 508, a signal may be generated upon completion of the data write back to the flash memory. For example, the processor-bus command of the Step 505 and the signal of the Step 508 may be based on the processor bus protocol described in reference to FIGS. 1-3 above. In one or more embodiments, the signal is an interrupt signal to a particular processor core associated with the eviction of the processor page and the resulting write back.

Figure 6:
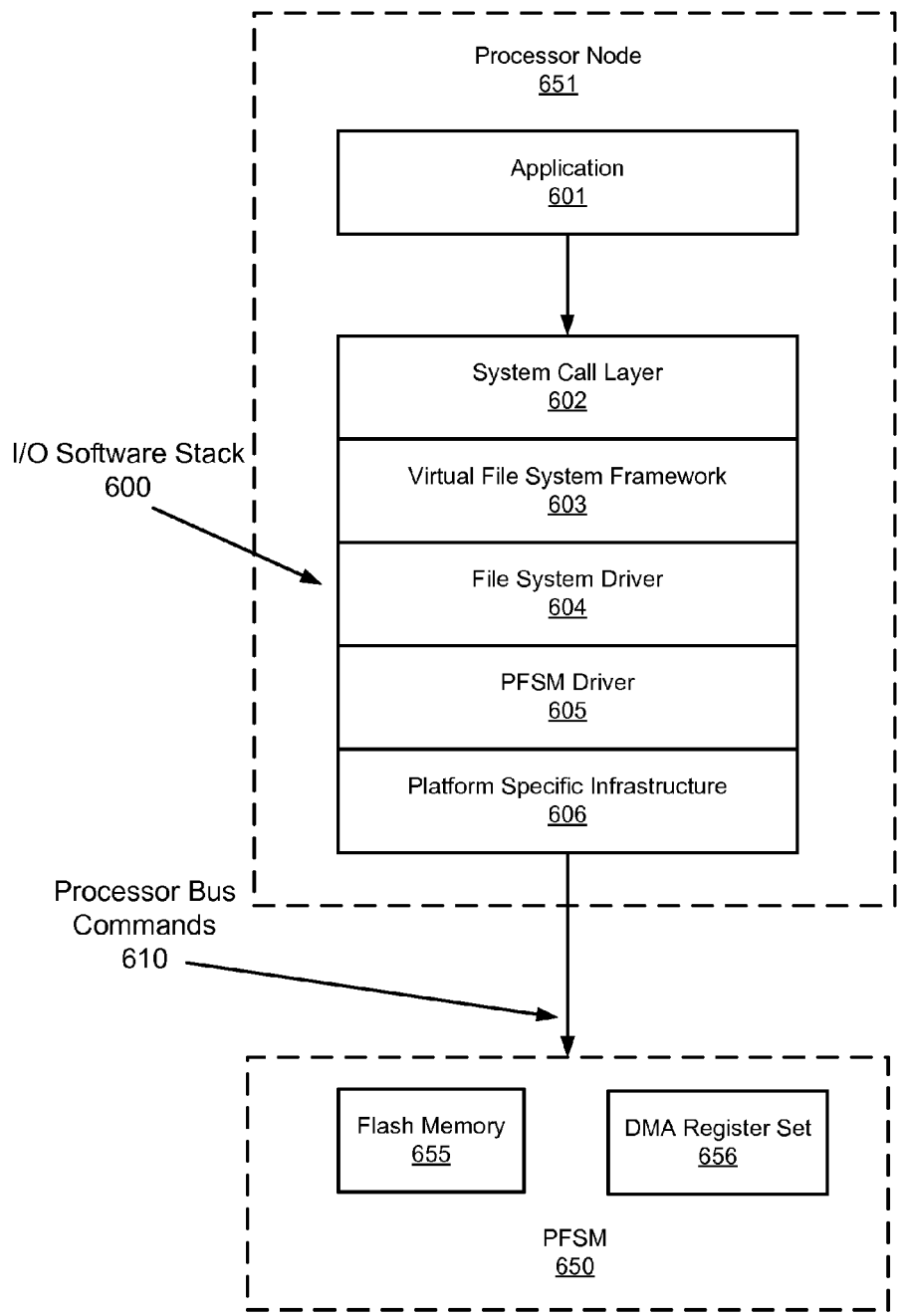
FIGS. 6 and 7 depict examples in accordance with one or more embodiments of the invention.

FIG. 6 depicts an example in accordance with one or more embodiments of the invention. Those skilled in the art, having the benefit of this detailed description, will appreciate the components shown in FIG. 6 may differ among embodiments of the invention, and that one or more of the components may be optional. In one or more embodiments of the invention, one or more of the components shown in FIG. 6 may be omitted, repeated, supplemented, and/or otherwise modified from that shown in FIG. 6. Accordingly, the specific arrangement of components shown in FIG. 6 should not be construed as limiting the scope of the invention.

In the example of FIG. 6, the application (601) (e.g., a HPC application such as a scientific research or engineering application) and the I/O software stack (600) are instructions stored in various memory (e.g., main memory, cache hierarchy, and/or other system memory) of the processor node (101), depicted in FIG. 1 above. For example, certain task of the application (601) may be executing in a thread, which in turn executes on one of the cores in the processor node (101). Generally speaking, the I/O software stack (600) is part of an operating system (not shown) environment supporting the application (601) for accessing the physical flash memory device, such as the flash memory (655) embedded in the PFSM (650) depicted in FIG. 3 above. As discussed in reference to FIGS. 4 and 5 above, the application (601) may access the flash memory (305) using at least the processor bus commands (610) described in reference to FIGS. 4 and 5 above. As shown in FIG. 6, the I/O software stack (600) includes the system call layer (602), the virtual file system framework (603), the file system driver (604), the PFSM driver (605), and the platform specific infrastructure (606), which together generates such processor bus commands (610) when the application (601) accesses the flash memory (305). Various details of the processor node (101) and the PFSM (300) are not specifically shown in FIG. 6 for clarity.

For example during the course of execution, the application (601) may generate a request to access a data structure (not shown) through the I/O software stack (600) while a portion of such data structure may reside in the flash memory (655) of the PFSM (650), which is configured as a block device (i.e., accessible in data blocks) in the operating system environment. While the file system driver (604) contains the file system specific code (e.g., caching etc), the PFSM layer (i.e., the PFSM driver (605) and the platform specific infrastructure (606)) performs the functionality of a block device driver to interface with the PFSM (650). For different operating systems, the implementation of the I/O software stack can retain the existing block device driver and build the PFSM layer beneath the block device layer. As illustrated in the general layered structure of the I/O software stack (600), this invention does not depend upon a specific file system (e.g., the virtual file system framework (603) and the file system driver (604)) and does not affect the semantics of the file system operation (e.g., the system call layer (602)).

As an example, the file system describes data storage in terms of pages (i.e., file system pages) with size "P" bytes. The flash memory (655) may have small block sizes (i.e., flash page size), for example "B" bytes, where "B"<<"P". Since the PFSM (650) is configured as a block device, dirty blocks inside a page are tracked in the same manner as other existing block devices in the operating system environment. Other implementation specific bookkeeping can be maintained in the PFSM driver (605) and the platform specific infrastructure (606), which may be implemented as the PFSM layer beneath the generic block device driver.

In the example of a read call, the application (601) invokes a system call in the system call layer (602) that calls appropriate handler in the file system (i.e., the virtual file system framework (603) and the file system driver (604)). The file system checks its cache for the presence of the requested page of the Read call. On a page miss, the file system identifies a victim page for eviction from the cache hierarchy of the processor node (651) and schedules a write back (e.g., described in reference to FIG. 5 above) if the victim page is dirty. With the cache location of the evicted page now available, the file system schedules a page-read by calling the PFSM driver (605) with a page read request, which initiates the method steps described in reference to FIG. 4 above.

In this example, referring back to FIG. 3, the logic module (301) may be an ASIC that maintains the address mapping table (345) as a block-table at the flash block (i.e., flash page) granularity. The block table provides the mapping between the flash block (i.e., flash page) address and the cached flash page address in the cache partition (341). Since the flash block size "B" is less than the file system page size "P", this helps to reduce the number of reads to the flash memory (305) for improved performance. Based on the block table, the ASIC schedules reads to the flash blocks that are not in the PFSM DRAM (303) and updates the cache replacement list (344), for example a LRU (i.e., least recently used) list of cached pages in the DRAM cache partition (341). On completion of the reads, the PFSM (300) issues processor-bus commands to transfer the data to processor memory (e.g., main memory (203 in FIG. 2) of the processor node (101 in FIG. 2)).

Returning to FIG. 6, in the example of a write call, the application (601) invokes a system call in the system call layer (602) that calls the appropriate handler in the file system. The file system checks its cache for the presence of the requested page of the write call. On a page hit, the file system driver writes the application data to the file system cache and marks the block (i.e., the written file system page) dirty. On a page miss, the file system first schedules a page-read with the PFSM driver (605), then continues with the write back operation, i.e., when the file system evicts a dirty page it schedules a write back with the PFSM driver (300) using the page number of the page being evicted.

To perform the write back operation, the PFSM driver (605) performs one or several DMA-write transactions to the PFSM (650) to write back the dirty blocks (i.e., the written file system page). Each DMA-write writes back multiple contiguous flash pages to the flash memory (655). The PFSM driver (605) performs a DMA-write by issuing four stores to the DMA register set (656) in the PFSM (650) as described above. Responsive to the PFSM driver (605), the PFSM (650) allocates a write context on the first store. On receiving the fourth store, the ASIC issues processor bus commands to read data from the processor memory (e.g., main memory (203 in FIG. 2) of the processor node (101 in FIG. 2)). In particular, the ASIC allocates blocks in the cache-partition (341 in FIG. 3) to cache the incoming data. The ASIC updates its block-table (345 in FIG. 3) to reflect the mapping between corresponding flash pages and the cached flash pages written with the incoming data in the DRAM cache partition (341 in FIG. 3). Dirty blocks (i.e., cached flash pages) evicted from the cache-partition (341 in FIG. 3) are the written to the flash memory (305 in FIG. 3). Further, the ASIC updates the LRU-list and marks the cached flash pages written with the incoming data dirty as well as interrupts the core executing the application (601) to indicate the completion of DMA.

Since the processor bus is designed to support small sized data transfers of a cache line size or less, small updates representing partial updates to pages can be transferred from processor memory to PFSM (650) individually, without additional overheads. Hence, when using the PFSM (650), large sequential I/O accesses are not required to obtain good performance. This makes PFSM (650) suitable to random-patterned small writes such as in-node updates.

Figure 7:
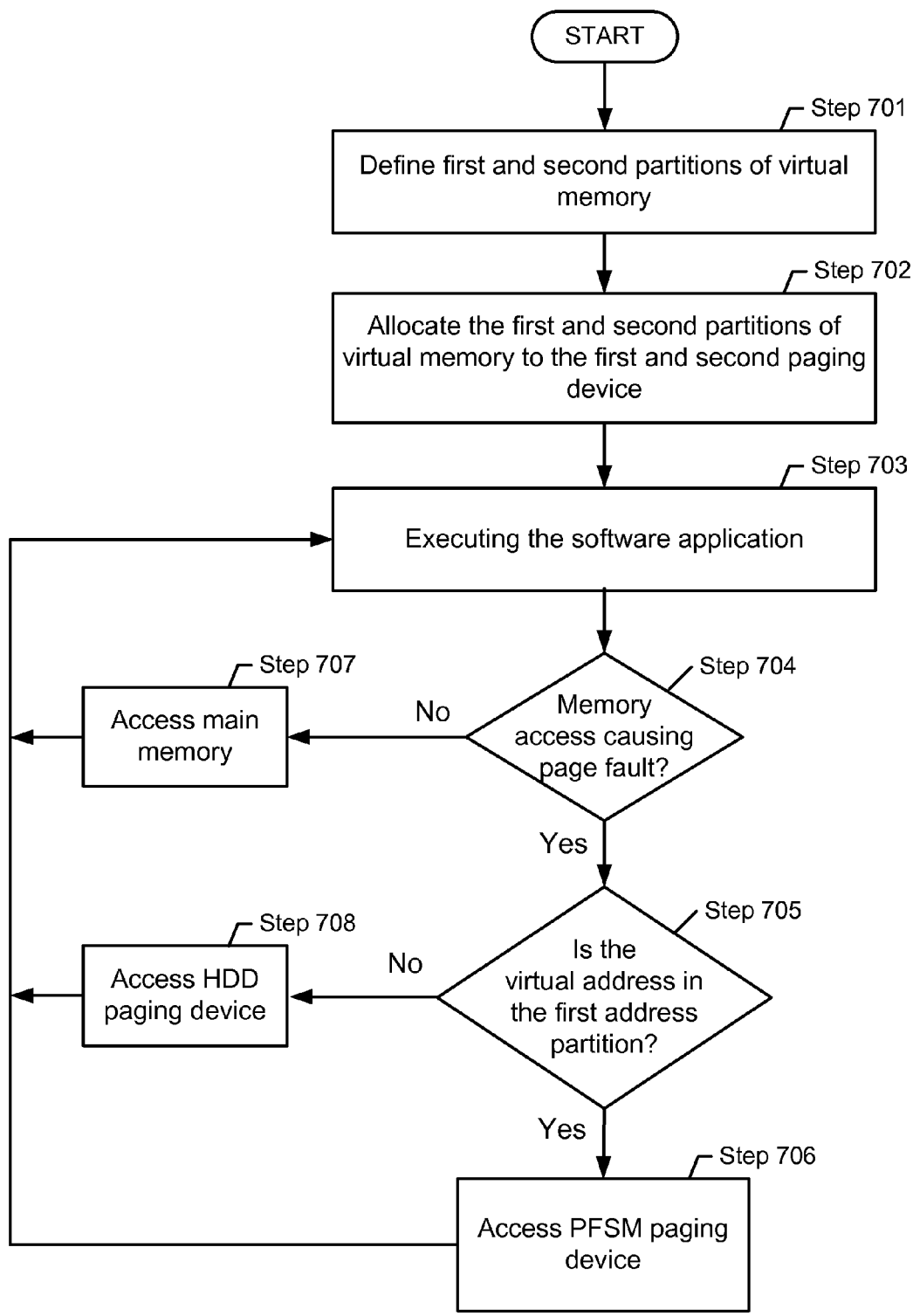

FIG. 7 depicts another example in accordance with one or more embodiments of the invention. Those skilled in the art, having the benefit of this detailed description, will appreciate that one or more of the steps shown in FIG. 7 may be omitted, repeated, and/or performed in a different order. Accordingly, embodiments of the invention should not be considered limited to the specific arrangements of steps shown in FIG. 7.

In an example, the operating system environment described in reference to FIG. 6 above may support a virtual memory environment for the application (601 in FIG. 6). FIG. 7 shows a method for the application (601 in FIG. 6) to access certain data structure in the virtual memory environment using a heterogeneous paging system including a combination of a hard disk (HDD) paging device (e.g., the I/O device (201 in FIG. 2) and another paging device based on the PFSM (300 in FIG. 3). For example, portions of the data or instructions of the application (601 in FIG. 6) may reside in the main memory (203 in FIG. 2), the HDD I/O device (e.g., 201 in FIG. 2), and/or the PFSM (300 in FIG. 3). In such virtual memory environment, portions of the data or instructions of the application (601 in FIG. 6) may be swapped in/out of the main memory (203 in FIG. 2) based on paging operations described in reference to FIG. 7 below.

In the example of FIG. 7, instead of the block-table described above, the address mapping table (345 in FIG. 3) of the PFSM (300 in FIG. 3) is maintained as a VA table (virtual address table) consisting of mappings from virtual addresses in the CPU virtual memory address space of the processor node (101 in FIG. 2) to flash page addresses and cached flash page addresses in the DRAM cache partition (341 in FIG. 3).

As shown in the example flowchart of FIG. 7, initially in Step 701, first and second partitions of the virtual memory (i.e., the CPU virtual memory address space) is defined. For example, the operating system divides the virtual memory region into two subsets. One subset uses HDD as associated paging device and the other uses PFSM (300 in FIG. 3) as associated paging device. The division of the virtual memory region may be illustrated in the following three examples.

(1) The virtual memory partition is configured at system startup on a system basis. The partitioning in this case is static. The virtual memory region of every process (or thread) executing in the operating system environment is divided in fast VM (i.e., virtual memory based on PFSM (300 in FIG. 3)) and slow VM (i.e., virtual memory based on HDD) in the same preset proportions.

(2) The virtual memory partition is configured at the time of start of an application (e.g., Application (601 in FIG. 6)) on a per-application basis. The fraction of fast VM to slow VM is specified at the time of process startup. This method provides more flexibility in a multi-programmed environment.

(3) The virtual memory partition is configured based on an application controlled VM allocation. Application (e.g., Application (601 in FIG. 6)) can specify fast or slow VM for every memory allocation request. This method provides the maximum flexibility for applications. An example mechanism may depend upon the operating system implementation and complexity constraints.

In one or more of the three above example, the partition may be determined based on a memory access pattern of the application (e.g., Application (601 in FIG. 6)) running under the operating system environment.

Returning to the flowchart in FIG. 7, in Step 702, the first and second partitions of the virtual memory are allocated to the fast VM paging device (e.g., based on PFSM (300 in FIG. 3)) and the slow VM paging device (e.g., based on HDD). For example, the operating system maintains the following additional information in its data structures:

(1) Virtual address space partition information:

Depending on the partition scheme used (as discussed above), the operating system maintains the paging device ID (i.e., handle) for different address ranges. On a page fault the operating system refers to this data structure to determine the appropriate paging device. The type and form of the data structure to store the above information is implementation specific.

(2) An operating system device driver is required to communicate to the PFSM (300 in FIG. 3) as the fast VM paging device. The virtual memory subsystem (e.g., implemented using the virtual file system framework (603 in FIG. 6) and the file system driver (604 in FIG. 6)) uses this driver to transfer pages from the flash based paging device to main memory. For example, such operating system device driver may be a variation of the PFSM driver (605 in FIG. 6) described in the example of FIG. 6 above.

Once the virtual memory partitions are defined and allocated to VM paging devices, the software application (e.g., Application (601 in FIG. 6)) executes in the operating system environment similar to the example of FIG. 6 above (Step 703). From time to time a virtual memory page fault may be detected (Step 704). Typically, the main memory (e.g., 203 in FIG. 2) may be accessed by the application (601 in FIG. 6) and return to Step 703 when there is no page fault (Step 707). However, when it is determined that a page fault occurred, a determination is made in Step 705 for the following two cases:

Case1: The virtual memory page resides in disk storage (e.g., in the second partition), in which case the operating system handles this as a normal page fault using the slow VM paging device (Step 708) and return to Step 703.

Case2: The virtual memory page resides in PFSM (650 in FIG. 6), in which case the Step 706 is performed, before returning to Step 703, by the following operations:

(a) The operating system uses the paging device ID to route the request to the underlying device drivers (604 and 605 in FIG. 6).

(b) The PFSM driver (605 in FIG. 6) issues a page read/write command as a set of store instructions to the DMA registers in the PFSM (300 in FIG. 3).

(c) Similar to the example of FIG. 6, the set of store instructions specify the operation type, physical main memory address and the page size. However, the physical flash page address specified in the store instructions of FIG. 6 is now virtual address for the example of FIG. 7.

(d) The PFSM (300 in FIG. 3) refers to the VA table to translate the virtual address to the flash page address and the DRAM buffer address (i.e., cached flash page address in DRAM cache partition (341 in FIG. 3)). All flash memory transfers are buffered in the DRAM buffer (i.e., the cache partition (341 in FIG. 3)) in the PFSM device.

(e) If the page exists in the DRAM cache partition (341 in FIG. 3), the PFSM (300 in FIG. 3) performs the read/write operation on the DRAM (303 in FIG. 3). On a DRAM miss, a flash memory transfer is initiated.

(c) The PFSM (300 in FIG. 3) schedules DMAs to transfer the data to/from physical memory (main memory (203 in FIG. 2)) using processor bus commands (610 in FIG. 6).

(d) On completing the operation PFSM (300 in FIG. 3) interrupts the processor.

The heterogeneous paging device configuration described above may be used as a part of a HPC cluster, for example used for scientific research and engineering applications such as computational fluid dynamics and the building and testing of virtual prototypes as well as business applications such as data warehousing, line-of-business (LOB) applications, and transaction processing.

Figure 8:
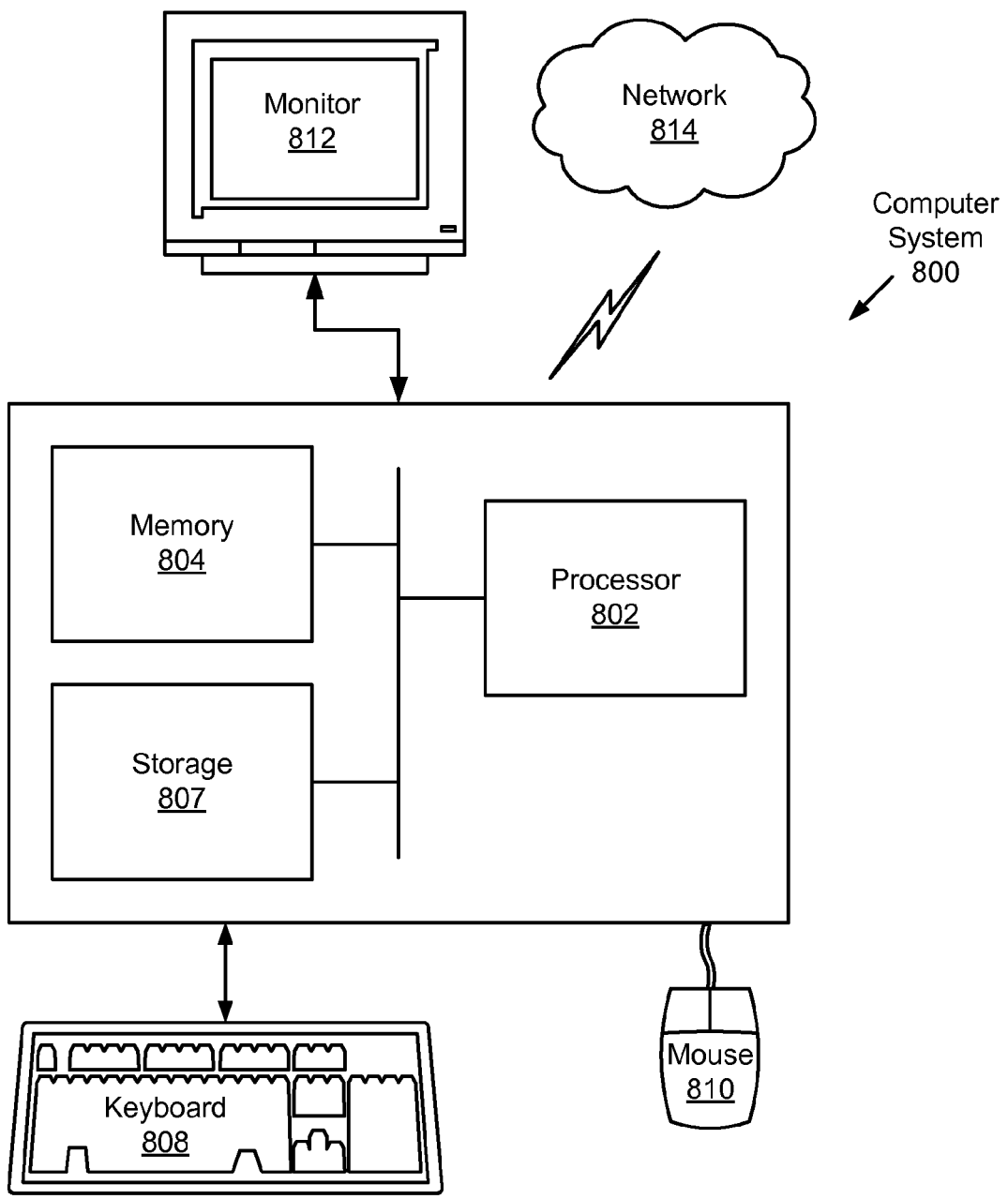
FIG. 8 depicts a computer system in accordance with one or more embodiments of the invention.

Embodiments of the invention may be implemented on virtually any type of computer regardless of the platform being used. For example, as shown in FIG. 8, a computer system (800) includes one or more processor(s) (802), associated memory (804) (e.g., random document access memory (RAM), cache memory, flash memory, etc.), a storage device (806) (e.g., a hard disk, an optical drive such as a compact disk drive or digital video disk (DVD) drive, a flash memory stick, etc.), and numerous other elements and functionalities typical of today's computers (not shown). The computer (800) may also include input means, such as a keyboard (808), a mouse (810), or a microphone (not shown). Further, the computer (800) may include output means, such as a monitor (812) (e.g., a liquid crystal display (LCD), a plasma display, or cathode ray tube (CRT) monitor). The computer system (800) may be connected to a network (not shown) (e.g., a local area network (LAN), a wide area network (WAN) such as the Internet, or any other similar type of network) with wired and/or wireless segments via a network interface connection (not shown). Those skilled in the art will appreciate that many different types of computer systems exist, and the aforementioned input and output means may take other forms. Generally speaking, the computer system (800) includes at least the minimal processing, input, and/or output means necessary to practice embodiments of the invention.

Further, those skilled in the art will appreciate that one or more elements of the aforementioned computer system (800) may be located at a remote location and connected to the other elements over a network. Further, embodiments of the invention may be implemented on a distributed system having a plurality of nodes, where each portion of the invention (e.g., various modules of FIG. 1) may be located on a different node within the distributed system. In one embodiments of the invention, the node corresponds to a computer system. Alternatively, the node may correspond to a processor with associated physical memory. The node may alternatively correspond to a processor with shared memory and/or resources. Further, software instructions for performing embodiments of the invention may be stored on a computer readable medium such as a compact disc (CD), a diskette, a tape, a file, or any other computer readable storage device.

One or more embodiments of the invention exhibit one or more of the following advantages. By accessing flash based solid state disk drive directly via the processor bus, the I/O bus and associated interface overheads are eliminated to improve (e.g., by an order of magnitude) bandwidth and latency over the scheme of using the I/O bus to transfer data. For example, the PFSM achieves higher performance as a paging device in virtual memory systems because the address translation overhead for each paging command is reduced compared to IO-bus-connected solid state disk drive. Accordingly, applications with frequent paging from very large datasets can now be executed with orders of magnitude improvement in performance. At the same time, the memory performance of workloads that do not require the fast paging is not adversely affected. Said in other words, embodiments of the invention provides a heterogeneous paging configuration that is advantageous over schemes using only one type of paging device because of the ability to selectively direct pages to flash based paging device or HDD based paging device based on software instruction access pattern of the application. Furthermore, because the PFSM interfaces directly with the processor bus, partial updates can be performed to enable higher degree of random access at increased efficiency and lower latency. In particular, the aforementioned advantage is achieved without requiring any modifications to the processor or the memory controller of existing processor nodes in the system.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A system comprising a plurality of nodes coupled using a network of processor buses, wherein the plurality of nodes comprises:
   a first processor node comprising one or more processing cores and main memory; and
   a flash memory node coupled to the first processor node via a first processor bus of the network of processor buses, the flash memory node comprising:
   a flash memory comprising a plurality of flash pages;
   a first memory comprising:
      a cache partition for storing cached flash pages for the plurality of flash pages in the flash memory; and
      a control partition for storing cache control data and contexts of requests to access the plurality of flash pages; and
   a logic module comprising a direct memory access (DMA) register and configured to:
      receive a first request from the first processor node via the first processor bus to access the plurality of flash pages, wherein the first request is received using the DMA register that is mapped into an address space of the first processor node,
      store one or more parameters of the first request as a first context of the contexts stored in the control partition of the first memory,
      schedule a DMA operation responsive to the first request, and
      perform the DMA operation based on the first context,
   wherein the DMA operation transfers data between the flash memory and the first processor node and comprises accessing the cache partition in the first memory when a portion of the plurality of flash pages is cached in the cache partition according to the cache control data.

2. The system of claim 1,
   wherein performing the DMA operation further comprises issuing a command of the processor bus to transfer data between the flash memory and the first processor node,
   wherein the logic module is further configured to generate an interrupt to the processor when the DMA operation is completed, and
   wherein the flash memory node further comprises a second memory for storing cached portions of the control partition of the first memory.

3. The system of claim 1,
   wherein the control partition of the first memory further comprises a flash page address mapping table,
   wherein the logic module is further configured to generate, based on the flash page address mapping table, a cached flash page address in the cache partition from a flash page address comprised in the one or more parameters, and
   wherein the DMA operation is performed based at least on the cached flash page address.

4. The system of claim 1,
   wherein the flash memory is a virtual memory paging device for the first processor node,
   wherein the control partition of the first memory further comprises a virtual address mapping table,
   wherein the logic module is further configured to generate, based on the virtual address mapping table, at least one of a flash page address in the flash memory and a cached flash page address in the cache partition from a virtual address comprised in the one or more parameters, and
   wherein the DMA operation is based on the at least one of the flash page address in the flash memory and the cached flash page address in the cache partition.

5. The system of claim 2,
   wherein the first request is generated by a first thread executing on a first processor core of the one or more processor cores in the first processor node,
   wherein the logic module is further configured to:
      receive a second request via a second processor bus to access the plurality of flash pages, wherein the second request is generated by a second thread running on one of a group consisting of the first processor core and a second processor core, wherein the second processor core is located in one of a group consisting of the first processor node and a second processor node of the plurality of processor nodes, the second processor node coupled to the flash memory node via the second processor bus of the processor buses;
      store the second request as a second context of the contexts stored in the control partition of the first memory;
      schedule a second DMA operation responsive to the second request; and
      perform the second DMA request based on the second context concurrently with the first DMA operation.

* * * * *